Patented Sept. 29, 1931

1,824,951

UNITED STATES PATENT OFFICE

JOHN FREI, OF WILMINGTON, DELAWARE, ASSIGNOR TO E. I. DU PONT DE NEMOURS & COMPANY, OF WILMINGTON, DELAWARE, A CORPORATION OF DELAWARE

PROCESS OF MAKING ALKYL CHLORIDES

No Drawing.   Application filed March 19, 1925. Serial No. 16,808.

This invention relates to the production of alkyl chlorides and especially of such chlorides in which the alkyl group contains less than three carbon atoms, such for example as methyl chloride and ethyl chloride, and includes as the preferred embodiment heating together an alkali-metal chloride, sulphuric acid and an alcohol having preferably one or two carbon atoms, and bringing the resulting vapor mixture, comprising alkyl chloride, alcohol, hydrogen chloride and water, into contact with a metal chloride (such as zinc chloride or ferric chloride) heated to a temperature between 100 and 150° C., said metal chloride being in the form of an aqueous solution.

It is known that ethyl chloride can be made by heating dilute sulphuric acid with sodium chloride and alcohol. According to that process the alcohol must be fed slowly and the ethyl chloride must go through a reflux condenser in order to prevent alcohol from escaping unchanged from the reaction vessel. It takes 40 to 50 hours to finish one batch and there has been no known way of speeding up the reaction.

I have now discovered a method of carrying out this process in a much shorter time, about one fourth to one fifth of the time mentioned above, thus increasing the production of the equipment four to five fold. This new method is characterized by the use of a second reaction vessel containing a ferric chloride or a zinc chloride solution which is preferably kept at a temperature between 110° and 150° C. The vapors coming from the first reaction vessel comprising ethyl chloride, alcohol, hydrogen chloride, and water are carried through the second reaction vessel without being refluxed on leaving the first vessel. The metal chloride solution in the second vessel absorbs alcohol and hydrogen chloride and promotes further reaction between them and at a higher temperature than before. Care should be taken that the vapors escaping from the first vessel contain at least one equivalent of hydrogen chloride for each equivalent of alcohol carried at the same time in the mixture. This can easily be accomplished by regulating the temperature and the rate of feeding sulphuric acid to the first vessel. The vapors leaving the second vessel contain only a negligible quantity of alcohol. They are washed successively by water and concentrated sulphuric acid to free them from hydrochloric acid and ether, and are then condensed.

*Example.*—An acid proof vessel is charged with salt (sodium chloride) and dilute sulphuric acid (e. g. from 40% to 50% strength) and heated up to 90° C., sufficient dilute acid being used to wet the salt and facilitate the heating thereof. To this mixture I let slowly run in a mixture of strong sulphuric acid and alcohol. The escaping vapors are carried through the zinc chloride solution in the second reaction vessel, which previously has been heated to 135° C. This temperature is maintained during the whole process. When the sulphuric acid-alcohol mixture has been fed in, the temperature in the first reaction pot is gradually raised till the development of ethyl chloride is finished.

The ethyl chloride leaving the second reaction vessel is accompanied by water, hydrochloric acid, and traces of alcohol and ether, and is freed from them by successively washing with water and concentrated sulphuric acid.

Since, in the above example, the temperature of the zinc chloride solution is maintained constant thruout the operation it inevitably follows that, after the process is under way and a state of equilibrium established, the water which is a product of the reaction will be removed from the catalyst solution as fast and only as fast, as it is formed. That this must be so is obvious when it is considered that any tendency of the water to accumulate in the catalyst solution would be counteracted by a corresponding lowering of the boiling point and a resulting increase in the amount of water boiled off, while any tendency of the water content to diminish would be counteracted by a corresponding rise of the boiling point of the solution and is kept within the preferred limits so long as the temperature range of 110°–150° C. is observed.

In the new process, as illustrated by the above example, the total quantity of sulphuric acid used should be the molecular equivalent of the quantity of salt used; but the quantity of sulphuric acid used should be in excess of the molecular equivalent of the alcohol used by from about 15 to 20%. The acid added in admixture with alcohol should be strong acid, for example between 90 and 100% preferably 93% strength, although if desired it may be less than 90% strength. The aqueous zinc chloride solution, the concentration of which will of necessity depend upon the temperature of operation, is desirably maintained at a temperature between about 110 and 150° C., and preferably (for ethyl chloride) at 135° C., or (for methyl chloride) at 120° C.

Although I have described my process in considerable detail, it will be understood that my invention is not limited to the particular conditions specified in the above specific example, but includes various changes and modifications not excluded by the terms of the appended claims. Instead of zinc chloride, I may use, in water solution, another metal chloride, for example ferric chloride, whose aqueous solution is capable of promoting reaction between an alcohol and hydrogen chloride at moderately high temperatures.

I claim:

1. The process of making an alkyl chloride which comprises heating together sodium chloride, sulphuric acid, and an alcohol to form a vapor mixture containing an alkyl chloride, alcohol, hydrogen chloride, and water, and bringing said vapor mixture in contact with an aqueous metal chloride solution capable of prompting reaction between said alcohol and said hydrogen chloride, said solution being maintained at a temperature between 100 and 150° C.

2. A process as defined in claim 1 in which the vapor mixture is brought in contact with an aqueous zinc chloride solution maintained at a temperature between 100 and 150° C.

3. In the process of making an alkyl chloride, the step which comprises passing a vapor mixture containing an alcohol and hydrogen chloride into an aqueous metal chloride solution capable of promoting reaction between said alcohol and said hydrogen chloride at a moderately high temperature, said solution being maintained at a temperature between 110 and 150° C.

4. In the process of making an alkyl chloride, the step which comprises passing a vapor mixture containing an alcohol and hydrogen chloride into an aqueous zinc chloride solution maintained at a temperature between 110 and 150° C.

5. The process of making ethyl chloride which comprises heating together sodium chloride, strong sulphuric acid, and ethyl alcohol to form a vapor mixture containing ethyl chloride, ethyl alcohol, hydrogen chloride and water, and bringing said vapor mixture in contact with an aqueous metal chloride solution maintained at such a temperature that the solution is capable of promoting reaction between said ethyl alcohol and said hydrogen chloride.

6. A process as defined in claim 5 in which the vapor mixture is brought in contact with an aqueous zinc chloride solution maintained at a temperature between 110° and 150° C.

7. In the process of making ethyl chloride the step which comprises passing a vapor mixture containing ethyl alcohol and hydrogen chloride into an aqueous metal chloride solution capable of promoting reaction between said ethyl alcohol and hydrogen chloride at a moderately high temperature, said solution being maintained at a temperature between 110 and 150° C.

8. In the process of making ethyl chloride the step which comprises passing a vapor mixture containing ethyl alcohol and hydrogen chloride into an aqueous zinc chloride solution at a temperature of about 135° C.

9. A process as set forth in claim 1 in which the vapor mixture contains at least one molecular equivalent of hydrogen chloride for each molecular equivalent of alcohol present.

10. A process as set forth in claim 3 in which the vapor mixture contains at least one molecular equivalent of hydrogen chloride for each molecular equivalent of alcohol present.

11. A process as set forth in claim 5 in which the vapor mixture contains at least one molecular equivalent of hydrogen chloride for each molecular equivalent of alcohol present.

12. A process as set forth in claim 7 in which the vapor mixture contains at least one molecular equivalent of hydrogen chloride for each molecular equivalent of alcohol present.

13. The process of making ethyl chloride which comprises heating to about 90° C. a mixture of 2 parts (by weight) of salt with about one part of dilute sulphuric acid, adding gradually, to the heated mass, a mixture of ethyl alcohol with concentrated sulphuric acid, and passing the resulting vapors through a zinc chloride solution heated to 135° C.

14. A process as defined in claim 13 in which, after the addition of alcohol and sulphuric acid is completed, the temperature of the reaction mass containing sodium sulphate is gradually raised until the formation and evolution of ethyl chloride is finished.

15. The process of making ethyl chloride which comprises passing of vapor mixture containing ethyl alcohol, hydrogen chloride, ethyl chloride and water into an aqueous solution of a chloride of the group consisting of zinc chloride and ferric chloride, said solution being maintained at a temperature between 110° and 150° C.

16. In the process of making an alkyl chloride which involves reacting an alcohol and hydrogen chloride in the presence of an aqueous metal chloride solution which is liquid at normal temperatures, the improvement which comprises simultaneously passing hydrogen chloride and vaporous ethyl alcohol into said solution while removing only the water vapor and ethyl chloride evolved, whereby the water content of said solution remains substantially constant and the process may be operated continuously.

17. In the process of making an alkyl chloride which involves reacting an alcohol and hydrogen chloride in the presence of an aqueous metal chloride solution which is liquid at normal temperatures, the improvement which comprises simultaneously passing vaporous ethyl alcohol and at least a molecularly equivalent quantity of hydrogen chloride into the said solution while maintaining it at a temperature between 110–150° C., and removing the water vapor and ethyl chloride evolved.

18. In the process of making ethyl chloride which involves reacting ethyl alcohol and hydogen chloride in the presence of an aqueous zinc chloride solution which is liquid at normal temperatures the improvement which comprises simultaneously passing vaporous ethyl alcohol and at least a molecularly equivalent quantity of hydrogen chloride into the said solution while maintaining it at a temperature of about 135° C. and removing the water vapor and ethyl chloride evolved whereby the water content of the zinc chloride solution remains substantially constant and the process may be operated continuously.

In testimony whereof I affix my signature.

JOHN FREI.

tion being maintained at a temperature between 110° and 150° C.

16. In the process of making an alkyl chloride which involves reacting an alcohol and hydrogen chloride in the presence of an aqueous metal chloride solution which is liquid at normal temperatures, the improvement which comprises simultaneously passing hydrogen chloride and vaporous ethyl alcohol into said solution while removing only the water vapor and ethyl chloride evolved, whereby the water content of said solution remains substantially constant and the process may be operated continuously.

17. In the process of making an alkyl chloride which involves reacting an alcohol and hydrogen chloride in the presence of an aqueous metal chloride solution which is liquid at normal temperatures, the improvement which comprises simultaneously passing vaporous ethyl alcohol and at least a molecularly equivalent quantity of hydrogen chloride into the said solution while maintaining it at a temperature between 110–150° C., and removing the water vapor and ethyl chloride evolved.

18. In the process of making ethyl chloride which involves reacting ethyl alcohol and hydogen chloride in the presence of an aqueous zinc chloride solution which is liquid at normal temperatures the improvement which comprises simultaneously passing vaporous ethyl alcohol and at least a molecularly equivalent quantity of hydrogen chloride into the said solution while maintaining it at a temperature of about 135° C. and removing the water vapor and ethyl chloride evolved whereby the water content of the zinc chloride solution remains substantially constant and the process may be operated continuously.

In testimony whereof I affix my signature.

JOHN FREI.

CERTIFICATE OF CORRECTION.

Patent No. 1,824,951.  Granted September 29, 1931, to

JOHN FREI.

It is hereby certified that error appears in the printed specification of the above numbered patent requiring correction as follows: Page 1, line 97, after "solution" insert a period and the words The water content therefore remains substantially constant so long as a given temperature is maintained; page 2, line 39, claim 1, for prompting" read promoting; line 126, claim 15, for "of" read a; and that the said Letters Patent should be read with these corrections therein that the same may conform to the record of the case in the Patent Office.

Signed and sealed this 17th day of November, A. D. 1931.

(Seal)

M. J. Moore,
Acting Commissioner of Patents.

CERTIFICATE OF CORRECTION.

Patent No. 1,824,951.                        Granted September 29, 1931, to

JOHN FREI.

It is hereby certified that error appears in the printed specification of the above numbered patent requiring correction as follows: Page 1, line 97, after "solution" insert a period and the words The water content therefore remains substantially constant so long as a given temperature is maintained; page 2, line 39, claim 1, for prompting" read promoting; line 126, claim 15, for "of" read a; and that the said Letters Patent should be read with these corrections therein that the same may conform to the record of the case in the Patent Office.

Signed and sealed this 17th day of November, A. D. 1931.

(Seal)                                                          M. J. Moore,
                                                            Acting Commissioner of Patents.